US008031773B2

(12) United States Patent
Cheng et al.

(10) Patent No.: US 8,031,773 B2
(45) Date of Patent: Oct. 4, 2011

(54) IMAGE PROCESSING APPARATUS

(75) Inventors: Chun-Ming Cheng, Taipei County (TW); Tsung-Hsiang Huang, Changhua County (TW)

(73) Assignee: Princeton Technology Corporation, Hsin Tien, Taipei County (TW)

( * ) Notice: Subject to any disclaimer, the term of this patent is extended or adjusted under 35 U.S.C. 154(b) by 912 days.

(21) Appl. No.: 12/068,360

(22) Filed: Feb. 5, 2008

(65) Prior Publication Data

US 2009/0060382 A1 Mar. 5, 2009

(30) Foreign Application Priority Data

Aug. 28, 2007 (TW) ............................... 96214289 U

(51) Int. Cl.
*H04N 7/12* (2006.01)

(52) U.S. Cl. .............................. 375/240.12; 375/240.21

(58) Field of Classification Search ........................ None
See application file for complete search history.

(56) References Cited

U.S. PATENT DOCUMENTS

| | | | | |
|---|---|---|---|---|
| 5,969,709 | A * | 10/1999 | Kim | 345/690 |
| 6,097,444 | A * | 8/2000 | Nakano | 348/607 |
| 6,538,648 | B1 * | 3/2003 | Koike et al. | 345/213 |
| 7,427,739 | B2 * | 9/2008 | Nagasawa | 250/214 R |
| 2005/0063586 | A1 * | 3/2005 | Munsil et al. | 382/162 |
| 2006/0017600 | A1 * | 1/2006 | Ho et al. | 341/155 |
| 2008/0205508 | A1 * | 8/2008 | Ziauddin et al. | 375/240.01 |

* cited by examiner

*Primary Examiner* — Hong Cho

(74) *Attorney, Agent, or Firm* — Muncy, Geissler, Olds & Lowe, PLLC

(57) ABSTRACT

An image processing apparatus is provided. The image processing apparatus comprises a converting module, a sampling module, a processing module, a storage module, an output module and a display module. The converting module is used for converting an input image to image data. The sampling module is coupled to the converting module for sampling the image data and generating sampling data. The processing module is coupled to the sampling module for processing the sampling data according a preset process and generating processing data. The storage module is coupled to the processing module for storing the processing data. The output module is coupled to the storage module for retrieving the processing data stored in the storage module and generating an image signal. The display module is coupled to the output module for displaying the image signal.

8 Claims, 4 Drawing Sheets

IMAGE PROCESSING APPARATUS

BACKGROUND

The invention relates to an image processing apparatus, and in particular to an image processing apparatus implemented in a field emission display (FED).

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

FIG. 1 illustrates a schematic view of a conventional image processing apparatus. As shown in FIG. 1, a conventional image processing apparatus 10 comprises a scanning module 12, a storage module 14, a processing module 16, an output module 18, and a display module 20. Conventional television signals implement an interlaced scan pattern, rather than a progressive scan pattern used for computer monitors. Accordingly, when the image processing apparatus 10 is utilized to display images specified by a television signal $S_{TV}$, an interlaced scan is performed by the scanning module 12 to generate two image frames from the image, wherein the two image frames comprise an image frame generated from odd scanning lines and another image frame generated from even scanning lines. These two image frames are stored in the storage module 14. When a minification or magnification process is to be performed on the image, samples are taken from the two image frames stored in the storage module 14 by the processing module 16. A deinterlacing process is then performed to generate a complete image. When a minification or magnification process is not performed on the image, a de-interlacing process is performed by the processing module 16 to generate a complete image. The complete image is then displayed by the display module 20.

The image processing method implemented in the conventional image processing apparatus 10, however, stores the two image frames in the storage module 14. The storage capacity consumed by storing the two image frames equals to the storage capacity consumed by storing the complete image. According to this method, large storage capacity is consumed in the storage module 14 and amount of information processed by processing module 16 is large, thus increasing the computing load of the processing module 16.

Accordingly, an image processing apparatus is needed to reduce amount of information that is to be processed and required storage capacity.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

An image processing apparatus is provided. The image processing apparatus comprises a converting module, a sampling module, a processing module, a storage module, an output module and a display module. The converting module is used for converting an input image to image data. The sampling module is coupled to the converting module for sampling the image data and generating sampling data. The processing module is coupled to the sampling module for processing the sampling data according a preset process and generating processing data. The storage module is coupled to the processing module for storing the processing data. The output module is coupled to the storage module for retrieving the processing data stored in the storage module and generating an image signal. The display module is coupled to the output module for displaying the image signal.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve specific developer goals, such as compliance with system-related and business-related constraints, which may vary from one implementation to another. Moreover, it should be appreciated that such a development effort might be complex and time consuming, but would nevertheless be a routine undertaking of design, fabrication, and manufacturing for those of ordinary skill in the art having the benefit of this disclosure.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. The leading digit(s) of reference numbers appearing in the figures corresponds to the figure number, with the exception that the same reference number is used throughout to refer to an identical component which appears in multiple figures. It should be understood that the many of the elements described and illustrated throughout the specification are functional in nature and may be embodied in one or more physical entities or may take other forms beyond those described or depicted.

Figure 1:
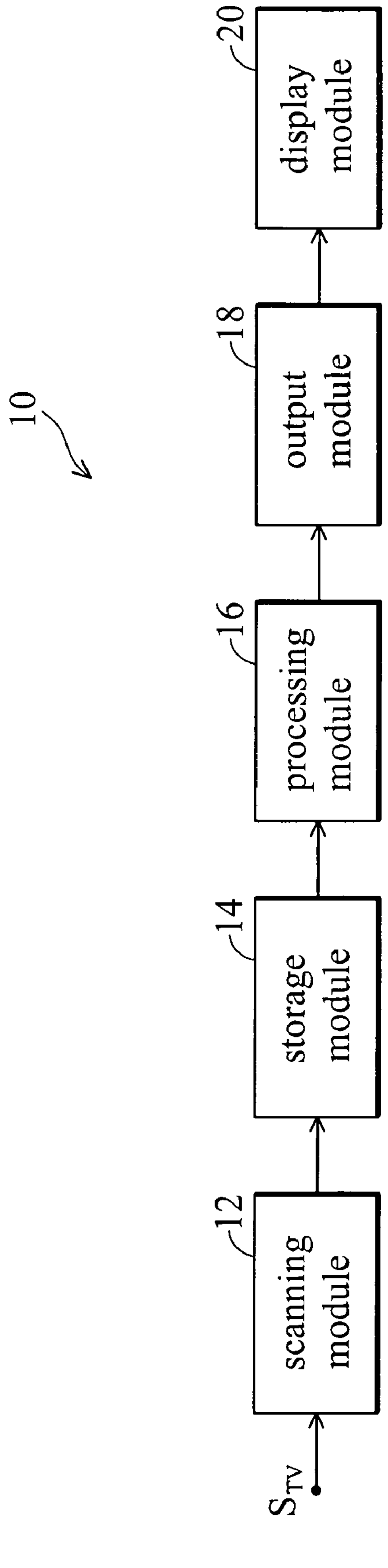
FIG. 1 ( PRIOR ART )
FIG. 1 illustrates a schematic view of a conventional image processing apparatus.
Figure 2:
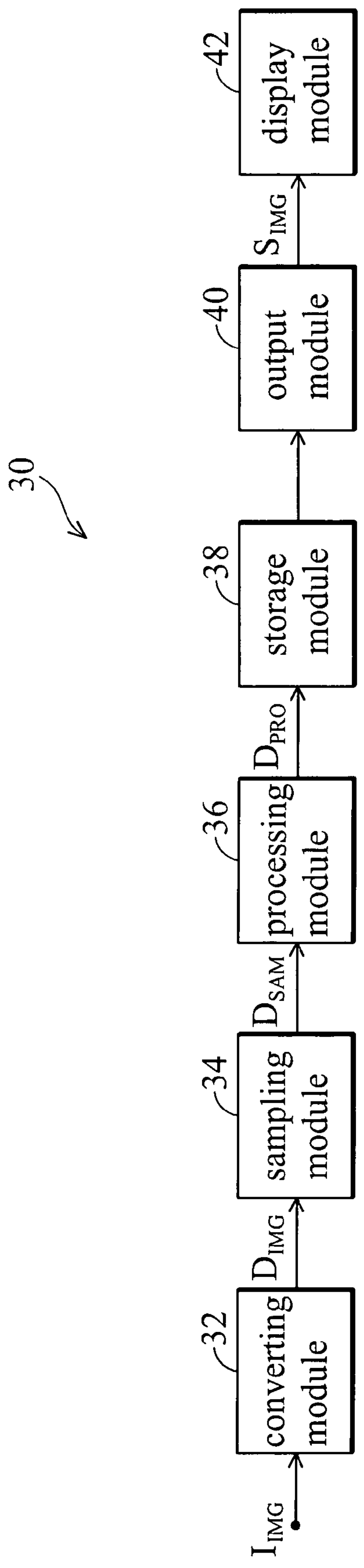
FIG. 2 illustrates a schematic view of an embodiment of an image processing apparatus.

FIG. 2 illustrates a schematic view of an embodiment of an image processing apparatus. An image processing apparatus 30 comprises a converting module 32, a sampling module 34, a processing module 36, a storage module 38, an output module 40 and a display module 42. The converting module 32 converts an input image $I_{IMG}$ into image data $D_{IMG}$ conformed to a specific format. Here, the specific format is an YCbCr 4:2:2 image format. The sampling module 34, coupled to the converting module 32, samples the image data $D_{IMG}$ to accordingly generate sampling data $D_{SAM}$. The processing module 36, coupled to the sampling module 34, processes the sampling data $D_{SAM}$ according a preset process to accordingly generate processing data $D_{PRO}$. Here, the preset process is a de-interlacing process, wherein the processing module 36 performs the de-interlacing process on the sampling data $D_{SAM}$ to accordingly generate the processing data $D_{PRO}$. The storage module 38, coupled to the processing module 36, stores the processing data $D_{PRO}$. Here, the storage module 38 is a dynamic random access memory (DRAM). The output module 40, coupled to the storage module 38, retrieves the processing data $D_{PRO}$ stored in the storage module 38 to accordingly generate an image signal $S_{IMG}$. The display module 42 is coupled to the output module 40 for displaying the image signal $S_{IMG}$. Here, the display module 42 is a field emission display (FED).

The de-interlacing process performed by the processing module 36 arranges the sampling data $D_{SAM}$ according to a specific sequence. According to this embodiment, the sampling module 34 separates the image data $D_{IMG}$ into at least one data group of odd lines and at least one data group of even lines, and samples the at least one data group of odd lines and the at least one data group of even lines to generate the sampling data $D_{SAM}$ accordingly. The specific sequence arranges the at least one data group of odd lines in sequence, and arranges the at least one data group of even lines in sequence.

Figure 3:
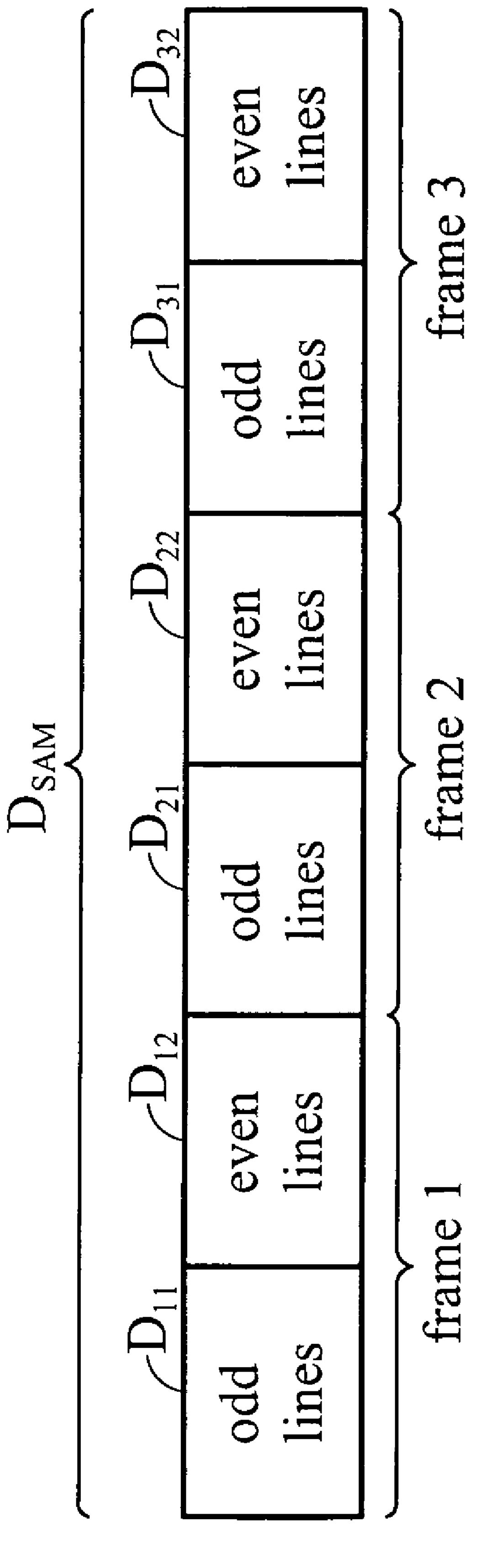
FIG. 3 illustrates a schematic view of an embodiment of a de-interlacing process performed by a processing module in an image processing apparatus.

FIG. 3 illustrates a schematic view of an embodiment of a de-interlacing process performed by a processing module in an image processing apparatus. Details of the de-interlacing process performed by the processing module 36 are provided below. As shown in FIGS. 2 and 3, the image data $D_{IMG}$ comprises three images. The sampling module 34 separates the images Frame 1||Frame 3 of the image data $D_{IMG}$ into: at least one data group of odd lines $D_{11}$ and at least one data group of even lines $D_{12}$ of the first image Frame 1; at least one data group of odd lines $D_{21}$ and at least one data group of even lines $D_{22}$ of the second image Frame 2; and at least one data group of odd lines $D_{31}$ and at least one data group of even lines $D_{32}$ of the third image Frame 3. The sampling module 34 then: samples the at least one data group of odd lines $D_{11}$ and the at least one data group of even lines $D_{12}$ of the first image Frame 1; samples the at least one data group of odd lines $D_{21}$ and the at least one data group of even lines $D_{22}$ of the second image Frame 2; samples the at least one data group of odd lines $D_{31}$ and the at least one data group of even lines $D_{32}$ of the third image Frame 3; and then accordingly generates the sampling data $D_{SAM}$.

Referring to FIGS. 2 and 3, the specific sequence: arranges the at least one data group of odd lines $D_{11}$ and the at least one data group of even lines $D_{12}$ in sequence; arranges the at least one data group of odd lines $D_{21}$ and the at least one data group of even lines $D_{22}$ in sequence; and arranges the at least one data group of odd lines $D_{31}$ and the at least one data group of even lines $D_{32}$ in sequence. Wherein the odd lines $D_{11}$~$D_{31}$ and the even lines $D_{12}$~$D_{32}$ are the odd lines data and the even lines data being sampled by the sampling module 34. Accordingly, all images specified in image data $D_{IMG}$ are processed by the de-interlacing process to generate the image data $D_{IMG}$ and then the image data $D_{IMG}$ are stored in the storage module 38 for further processing.

Figure 4:
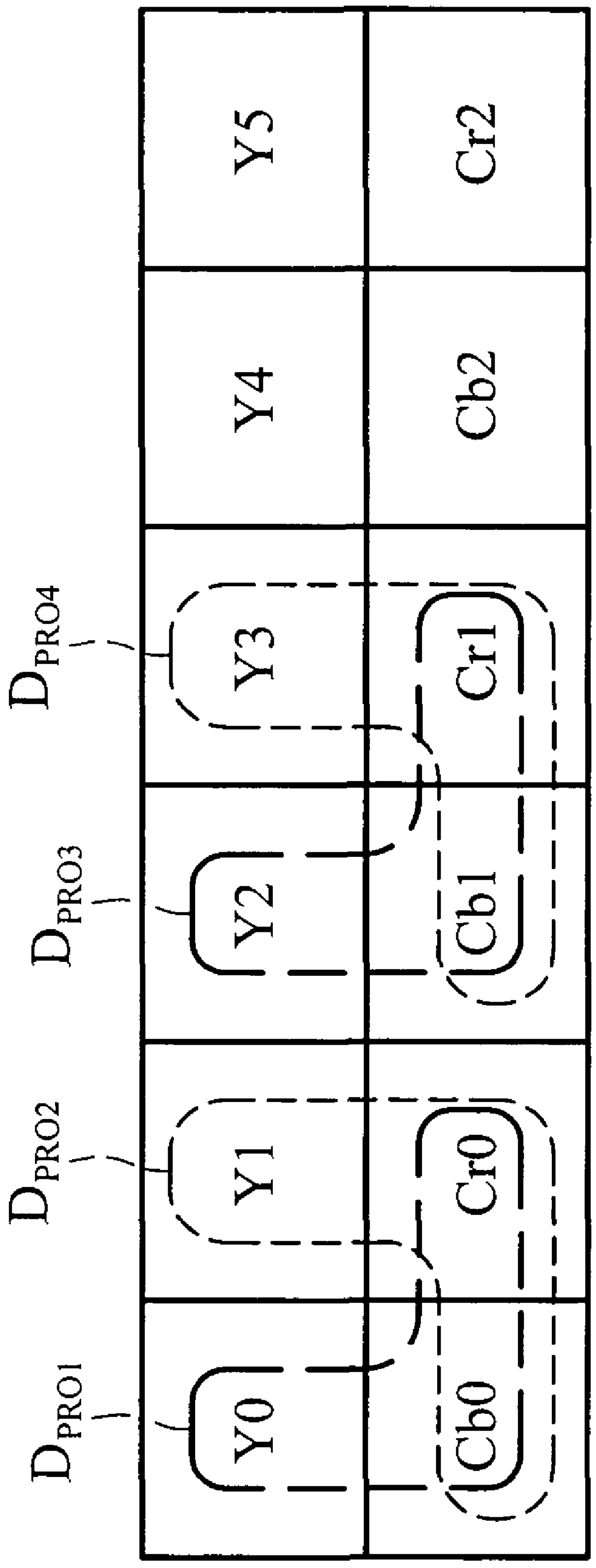
FIG. 4 illustrates a schematic view of an embodiment of storing sampling data performed by a storage module in an image processing apparatus.

FIG. 4 illustrates a schematic view of an embodiment of storing sampling data performed by a storage module in an image processing apparatus. As shown in FIGS. 2 and 4, the input image $I_{IMG}$ is conformed to YCbCr 4:2:2 image format. The storage module 38 stores the processing data $D_{PRO}$ in a format as shown in FIG. 4 according to the features of YCbCr 4:2:2 image format. Here, processing data $D_{PRO1}$~$D_{PRO4}$ are processed by processing module 36. The first processing data $D_{PRO1}$ is Y0Cb0Cr0, the second processing data $D_{PRO2}$ is Y1Cb0Cr0, the third processing data $D_{PRO3}$ is Y2Cb1Cr1, and the fourth processing data $D_{PRO4}$ is Y3Cb1Cr1. According to the way in which the storage module 38 stores the processing data $D_{PRO}$, the output module 40 first retrieves Y0Cb0Cr0 specified by the first processing data $D_{PRO1}$, then retrieves Y1Cb0Cr0 specified by the second processing data $D_{PRO2}$, and so on. The processing data $D_{PRO1}$~$D_{PRO4}$ are retrieved from storage module 38 in the way described above. The "Cb0Cr0" is shared by the first processing data $D_{PRO1}$ and the second processing data $D_{PRO2}$, and the "Cb1Cr1" is shared by the third processing data $D_{PRO3}$ and the fourth processing data $D_{PRO4}$. Accordingly, the storage requirement can be reduced by ⅓. This type of information content is one feature of the YCbCr 4:2:2 image format. Accordingly, details of the YCbCr 4:2:2 image format are not detailed here.

According to embodiments provided here, the input image is first converted to the YCbCr 4:2:2 image format by the image processing apparatus. Sampling and de-interlacing process are then performed and results obtained therefrom are stored and then displayed by the display module. By utilizing the features of the YCbCr 4:2:2 image format, the storage requirement can be largely reduced, for example, the storage requirement can be reduced by ⅓. In addition, the image data is first sampled, then de-interlaced and stored. Accordingly, amount of information that is to be processed and stored can be largely reduced. Accordingly, an image processing apparatus is provided here to reduce amount of information that is to be processed and required storage capacity.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing apparatus, comprising:

a converting module, converting an input image into image data conformed to a specific format;

a sampling module, coupled to the converting module, sampling the image data to accordingly generate sampling data;

a processing module, coupled to the sampling module, processing the sampling data according to a preset process to accordingly generate processing data;

a storage module, coupled to the processing module, storing the processing data;

an output module, coupled to the storage module, retrieving the processing data stored in the storage module to accordingly generate an image signal; and a display module, coupled to the output module, displaying the image signal.

2. The image processing apparatus of claim 1, wherein the specific format is an YCbCr 4:2:2 image format.

3. The image processing apparatus of claim 2, wherein the preset process is a de-interlacing process, wherein the processing module performs the de-interlacing process on the sampling data to accordingly generate the processing data.

4. The image processing apparatus of claim 3, wherein the de-interlacing process arranges the image data according to a specific sequence.

5. The image processing apparatus of claim 4, wherein the sampling module separates the image data into at least one data group of odd lines and at least one data group of even lines, and samples the at least one data group of odd lines and the at least one data group of even lines to accordingly generate the sampling data.

6. The image processing apparatus of claim 5, wherein the specific sequence arranges the at least one data group of odd lines in sequence, and arranges the at least one data group of even lines in sequence.

7. The image processing apparatus of claim 1, wherein the storage module is a dynamic random access memory (DRAM).

8. The image processing apparatus of claim 1, wherein the display module is a field emission display (FED).

* * * * *